(12) United States Patent
Camiel

(10) Patent No.: US 11,108,741 B2
(45) Date of Patent: Aug. 31, 2021

(54) SYSTEM AND METHOD FOR THE SEPARATION OF SYSTEMS THAT WORK TOGETHER

(71) Applicant: Noam Camiel, Tel Aviv (IL)

(72) Inventor: Noam Camiel, Tel Aviv (IL)

(\*) Notice: Subject to any disclaimer, the term of this patent is extended or adjusted under 35 U.S.C. 154(b) by 584 days.

(21) Appl. No.: 15/893,667

(22) Filed: Feb. 11, 2018

(65) Prior Publication Data

US 2018/0234390 A1 Aug. 16, 2018

Related U.S. Application Data

(60) Provisional application No. 62/457,940, filed on Feb. 12, 2017.

(51) Int. Cl.
*H04L 29/06* (2006.01)
*G06F 3/147* (2006.01)
(Continued)

(52) U.S. Cl.
CPC ............ *H04L 63/04* (2013.01); *G06F 3/14* (2013.01); *G06F 3/147* (2013.01); *G06F 9/452* (2018.02); *G06F 21/53* (2013.01); *G06F 21/74* (2013.01); *G06F 21/84* (2013.01); *H04L 63/145* (2013.01); *H04L 63/1408* (2013.01); *G09G 2354/00* (2013.01); *G09G 2370/022* (2013.01); *H04L 63/0209* (2013.01)

(58) Field of Classification Search
CPC .......... G06F 21/53; G06F 21/74; G06F 21/84; G06F 3/14; G06F 3/147; H04L 63/04; H04L 63/14; H04L 63/1408; H04L 63/1416; H04L 63/145
See application file for complete search history.

(56) References Cited

U.S. PATENT DOCUMENTS

| | | | | |
|---|---|---|---|---|
| 5,596,718 A | * | 1/1997 | Boebert | G06F 21/42 |
| | | | | 713/150 |
| 6,092,202 A | * | 7/2000 | Veil | G06F 21/34 |
| | | | | 705/64 |

(Continued)

*Primary Examiner* — Minh Dinh

(57) ABSTRACT

A system and method is introduced for separating computing devices that work together. The computing devices appear to the user as a single device such as through using a single display and other I/O means. The output of computing devices such as the display output, may be monitored for unwanted display output to the user which may be filtered from the user. The device displaying unwanted content may then be reverted to a known state. Computing devices may communicate among themselves using display data while remaining separated. Secure services from the cloud to a user device may be offered through the separated computing devices that work together, services that utilizes separating and securing the user I/O from internet connected devices, while allowing to monitor and filter the internet connected devices. These services preferably use a key that is non-extractable for communicating with the secure cloud. Such services from the cloud server may include a secure remote desktop for VDI/DaaS and a secure web browser There is also provided implementation of the system on different architectures using SW only or using some HW additions. Usage examples for vehicles, enterprises and others are described.

18 Claims, 10 Drawing Sheets

(51) Int. Cl.
*G06F 3/14* (2006.01)
*G06F 9/451* (2018.01)
*G06F 21/74* (2013.01)
*G06F 21/53* (2013.01)
*G06F 21/84* (2013.01)

(56) References Cited

U.S. PATENT DOCUMENTS

| | | | | |
|---|---|---|---|---|
| 6,836,787 | B1* | 12/2004 | Kasai | G06F 3/14 |
| | | | | 345/418 |
| 6,895,502 | B1* | 5/2005 | Fraser | G06Q 20/388 |
| | | | | 713/168 |
| 10,503,925 | B1* | 12/2019 | Hadsall | G06K 9/00087 |
| 2007/0120763 | A1* | 5/2007 | De Paepe | G09G 5/006 |
| | | | | 345/1.3 |
| 2009/0141895 | A1* | 6/2009 | Anderson | G06F 21/60 |
| | | | | 380/252 |
| 2011/0246812 | A1* | 10/2011 | Kilgore | G06F 9/451 |
| | | | | 714/2 |
| 2016/0065599 | A1* | 3/2016 | Hovor | H04L 63/1416 |
| | | | | 726/23 |
| 2018/0032733 | A1* | 2/2018 | Surdu | G06F 9/4881 |

* cited by examiner

SYSTEM AND METHOD FOR THE SEPARATION OF SYSTEMS THAT WORK TOGETHER

CROSS-REFERENCE TO RELATED APPLICATIONS

This application claims the benefit of US Provisional Patent Ser. No. 62/457,940 filed Feb. 12, 2017 by the present inventor.

U.S. application Ser. Nos. 14/231,482 and 14/231,500 by the present inventor are referred to in this application and herein incorporated in their entirety by reference into the specification. (referred to as the initial applications)

U.S. application Ser. No. 15/376,641 filed Dec. 12, 2016 by the present inventor is referred to in this application and herein incorporated in its entirety by reference into the specification (referred to as secondary application)

FIELD OF INVENTION

This invention generally relates to securing computing systems and more particularly but not exclusively to separating computing systems while allowing them to work together.

BACKGROUND OF THE INVENTION

Computing devices and especially network connected devices are susceptible to a range of attacks. Potentially malware infected end user devices creates a problematic environment to offer confidential services.

The recent successful computer attacks and especially Meltdown and Spectre demonstrate that Virtual Machines or Hypervisors (hereafter VMs) and process isolation are not air tight and potential side channel attacks are a real problem that must be considered especially for mission critical applications.

The present disclosure deals with protection from such and other attacks by separating critical processing from other processing even when these is a requirement for these to work together. The separation described in this disclosure separates these sub systems but still allows them to work together, such as to display data together and to communicate data.

The present disclosure deals with protection from different computer attacks by separating critical processing from other processing and by working at the display level for gaining computing isolation, display unity and communication that is safe from unwanted side effects.

The added value of working at the display level has three main advantages. The first is that isolated computing units, which may or may not be separate physical units, appear as a single seamless device to the user who is unaware of the separation.

The second advantage of working at the display level is that monitoring the display may allow the stopping of attacks that aim to effect the user viewing the display. Upon identifying such an attack, the system may block from view the unwanted part that aims to effect the user. The system can then reset the application, restore it to a known state or take some other action to revert to a known, trusted state.

The third advantage of working at the display level is allowing one way communication between systems by the passing of display data from one system to the other.

The kind of attacks that are identified at the display level may come from non-critical units that may attempt to resemble critical components to mislead the user. The display that is being monitored and acted upon may be under the control of a different system than the one that is being monitored. This way, systems are kept separate, yet under close control of a separate system. The different systems display may be combined to seem to the user as a single system.

Working at the display level takes a different approach to security. Securing systems usually means applying means of identifying attacks and breaches on the system we are trying to protect or on the channels that are communicating with it. By monitoring the display we are actually looking at the end result. The attacks that want to reach the user and display something to the user.

This kind of identification may leverage on secure boot mechanisms as well as other mechanisms that ensure the possibility of moving a system to a safe state. On those systems that are considered non critical and allow the user to make uncontrolled actions such as browse the internet, connect external devices and so forth, such identification at the display level, blocking of identified attacks that display to the user and moving the system to a known state is a quality that would be advantageous in cases where security may not be bullet proof.

In some cases knowing the expected system state may mean knowing what the display should look like for the different components that are displayed on the screen and some details regarding them. If the system has some aspects of the expected current display to compare to an actual displayed image it may assist in determining an unwanted behavior and the system responsible can easily be detected based on the display output of each system.

Some uses that come to mind are for example in vehicles. A vehicle may display a single screen with various components, some may be critical components, such as displaying warning to the driver to stop the car, while other components may be connected to the infotainment system. In some embodiments the vehicle display may be taken up mostly or entirely by the infotainment system at times while at other times critical messages may be displayed to the driver. It may be advantageous to identify and block attempts to fake messages to the driver through displaying messages to the driver through the infotainment system. The infotainment system may display a ransomware image or some other image that may shock the driver especially while driving and may also hurt the vehicle vendor image. Identifying blocking and moving back to a known state is advantageous in such situations.

In systems which are relatively closed such as vehicles, the display layout at different scenarios may be known in advance and may assist in detecting and identifying user displayable data that is to be removed from user viewing, i.e. fake vehicle information.

Some other advantages for working on the display level is the lack of feedback to the attacker who does not know if the attack is seen by the end user or not. The attacker has no way of detecting or shutting down means of identifying and blocking attacking attempts. The attacker itself through the display may be identified by various means, such as identifying text and images, OCR and AI based image similarity findings.

Another use is relevant to PCs and laptops. PCs and laptops used for making sensitive transactions or operations is now commonplace. From banking to financial on the one hand or for enterprise applications through remote desktop or enterprise web apps. The isolation of these sensitive applications from the PC or laptop is important because the PC or laptop may be infected by malware. Furthermore, identifying fake or misleading displays to the user may be useful to protect the user from reveling their passwords and secrets.

Another use may include IoT, for industrial applications utilizing above described methods as well as the separation between computing systems and integrating systems based on their display outputs. For example, one system may be isolated while the other system uses the isolated system display as its input.

Display data can be used to communicate device A data to another device B in a single direction A->B, without the ability of device B to infect device A with malware. This data communication may be a continuous one, using the display data of A into B.

Another one of the features of the present disclosure is the building a bridge between end user devices and a cloud service provider. This bridge masks the user from their device and directs the user to the cloud service provider, making it as if the user is located in the cloud service provider premises using a device on that premises.

The cloud service provider may offer services based on this bridge such as secure remote desktop application, secure browsing and secure applications in a way that user I/O is not accessible from the internet connected part of the device and the communication is taking place with the cloud service provider using a key that is preferably non-extractible.

Throughout this application the term cloud may also mean infrastructure provider or servers on the internet which may belong to the same owner or an external service provider.

Another one of the features of this disclosure is the ability to implement the bridge entirely on a single chip with no additional HW. This is so for ARM based devices as well as for Intel based devices.

Another one of the features of this disclosure is the ability to use this bridge to offer services such as Google Apps and other Google services directly to users.

Another one of the features of this disclosure is implementing secure path for keyboard, touch interface and other I/O devices on Intel and other platforms and to pair them together for forming the bridge which may be implemented as ac/dc net as described in the initial and secondary applications.

Another one of the features of this disclosure is utilizing two screens for the bridge such as ac/dc net on a user device as well as using a single full screen.

Another one of the features of this disclosure is a secure docking station for use with a user device for implementing ac/dc net and other bridge environments.

Another one of the features of this disclosure is offering a secure remote desktop for VDI and Daas and offering it as a service from a cloud service provider.

Another one of the features of this disclosure is offering a secure web browser and offering it as a service from a cloud service provider.

Another one of the features of this disclosure is offering a secure app and offering it as a service from a cloud service provider.

Another one of the features of this disclosure is the use of IoT devices with ac/dc net and other bridging technologies also for IoTs running on very low power.

Another one of the features of this disclosure is the use of the technology for vehicles for car safety.

A secure remote desktop as a service or installed at an IT VDI, so on the endpoint we have a secure remote desktop solution and on the service side we can call it secure DaaS or S-Daas for cloud and S-VDI for VDI; we have a secure web browser on the endpoint and on the cloud we have a secure web as a service, S-WaaS; We can also have a secure web app as a service. We can have a secure app as a service this way, for example a mobile app—this data and interface to user can generally be an app such as a phone app for banking, gmail etc.

There is thus a widely recognized need for this technology and services and it would be highly advantageous to have such a method devoid of the above limitations.

SUMMARY OF THE INVENTION

A system and method is presented for separating, combining and monitoring computing systems through their display. The display of separated computing units is combined, while display data is monitored for user protection. Identification of attempts to bypass protections are mitigated by blocking display and returning system to a known state. The separated computing units may communicate in a one way manner through passing of display data.

Furthermore, a system and method is presented for bridging a user device and a cloud service provider in a way that isolates user I/O from the user device and may be used for services and communication with the cloud service provider. Data communication for these services is made through the use of a key that is preferably non-extractable. This allows separation of services from the user device allowing to offer services in the cloud as if the user is located physically at the cloud.

Such services range from secure VDI/DaaS, web server serving web content securely to a secure web browser, secure apps etc. These services may also allow other $3^{rd}$ party services to offer users secure web based apps using the secure infrastructure.

These services may be based on the ac/dc net architecture in application Ser. No. 15/376,641.

Other capabilities include SW only implementations of the product on ARM and mostly on Intel platform, currently without keyboard direct path, which may in the future include keyboard direct paths as well.

Furthermore, according to one aspect of the present invention, there is provided a system for separating a plurality of computing devices that operate together comprising:
  a. two or more computing devices,
  b. a display combining function for combining at least part of display of said two or more computing devices to a single display,
  c. a display communication function for communicating one way image data of at least one computing device to at least one other computing device,
  whereby said separated devices work together by communicating data and displaying on the same display.

According to a second aspect of the present invention, there is provided a system for protecting a user display from displaying unwanted data comprising:
  a. two or more computing devices,
  b. a display combining function for combining at least part of display of said two or more computing devices to a single display,
  c. a monitoring unit for monitoring at least part of at least one computing device display output according to display criteria for said display,
  d. a modifying unit for modifying at least part of said monitored display on said user display when said criteria is found by said monitoring unit, whereby unwanted display according said criteria is modified to user view for protecting user display from displaying unwanted data to the user.

According to a third aspect of the present invention, there is provided a system for protecting a user display from displaying unwanted data comprising:

a. a computing device
b. a monitoring unit for monitoring at least part of display of said computing device according to citeria for said display,
c. a modifying unit for modifying at least part of said monitored display on said user display when said criteria is found by said monitoring unit, whereby unwanted display according to said criteria is modified to user view for protecting user display from displaying unwanted data to the user.

15. The system of 14 wherein said display monitoring unit and said display modifying unit are not accessible by said computing device.

According to a fourth aspect of the present invention, there is provided a method of protecting a user display from unwanted display data comprising:

a. monitoring said user display according to set criteria for said display;
b. modifying display on said user display when said monitoring unit matches said criteria;
c. resetting device to a known state following modifying of display.

According to a fifth aspect of the present invention, there is provided a method of separating a plurality of computing devices that operate together comprising:

a. sending at least part of display data from at least one device to at least one other device;
b. using at least part of said sent display data as one way communication data;
c. combining at least part of said sent display data together with at least part of display data of another device to output to the display.

Unless otherwise defined, all technical and scientific terms used herein have the same meaning as commonly understood by one of ordinary skill in the art to which this invention belongs. The materials, methods, and examples provided herein are illustrative only and not intended to be limiting Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

Figure 1A:
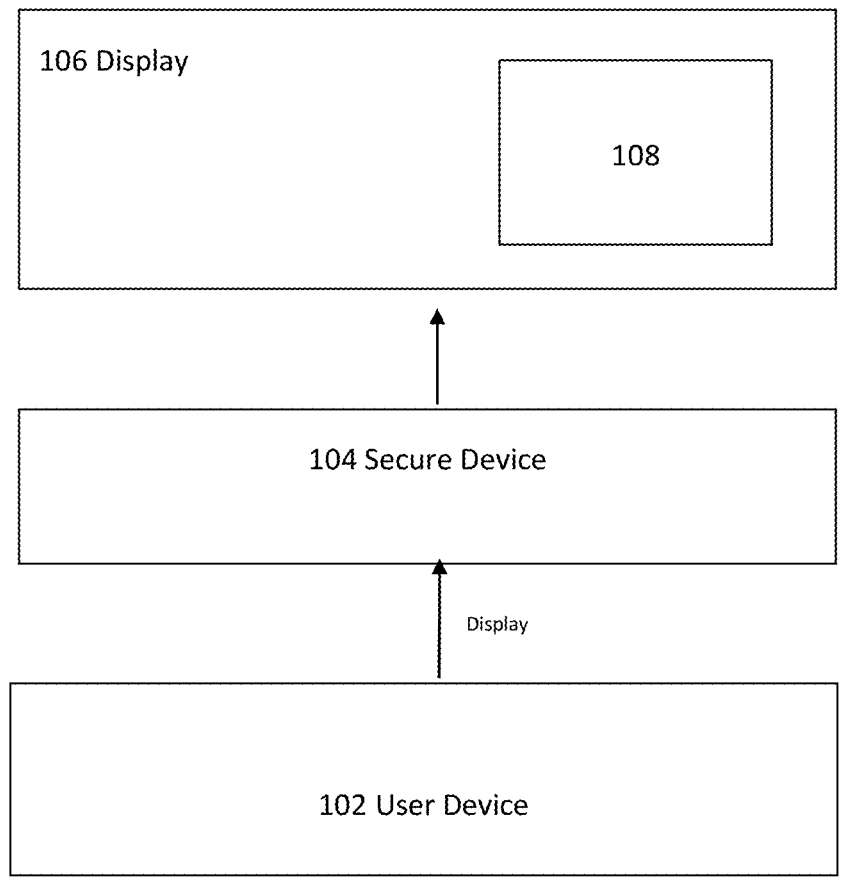
FIG. 1A is a block diagram illustration of a user device connected to a secure device which is connected to a display, in accordance with an embodiment of the present invention.

It will be appreciated that, for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DESCRIPTION OF THE PREFERRED EMBODIMENTS

The preferred embodiments teach separation of computing units, their combining together to form a seamless single system to the user, the monitoring of display to identify unwanted display data, mitigating such unwanted display data as well as allowing one way communication between these computing units.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention includes several embodiments that can be realized for implementing solutions that combine separated computing units as a seamless single unit for the user while monitoring the display to identify attempted attacks through a preferably separate computing unit or entity to the one being monitored.

A computing unit that is connected to the Internet and allows various functionality such as apps, communication, browsing and so forth may also require critical or secure applications to take place separately from the other applications and the risks of any potential malware.

Since 100% security is never possible on a single computing unit that is connected to a network and may be freely used by the user, and in light of vulnerabilities such as meltdown and spectre, it is preferred that some separation is in place for making secure transactions. On the other hand it is desired that a single, seamless user experience exists on a single display and single input means.

The present disclosure aims to do just that. To combine the output display of a critical system that may connect to a secure server while seamlessly combined with a separated computing device connected to the network. An input is able to be directed to each system separately. See previous applications. Such as the first and second applications for more detail.

In addition to the combining of the separated systems, this disclosure adds the ability to identify attempts of one system to breach the combined device. Such breach may be for example, to imitate a critical system from the connected system in order to fool the user; to scare the user by displaying false or intimidating displays; by applying ransom wares or imitating them etc.

Once identified, the discovered unwanted display may be removed from the display, altered, modified, hidden by another image, labelled with a warning, faded out, dimmed, made darker etc.

The end result from the combination of the separated computing units is preferable a user experiencing a single system through their single I/O means, where a monitoring of one or more systems may identify and block attempts to bypass certain limits set to each system.

In some embodiments there are certain aspects of the current displayed image at each time and comparing the expected display aspects to the current display image will result in the detection of an unwanted behavior. The responsible system is detected following the checking of each system display output.

As an example, take a vehicle where the driver has a single display for both entertainment, navigation and critical messages as well as car and road data. It is preferred that the infotainment system is separate from other systems while the other systems also may communicate with a remote secure server over the internet. While these should remain separated it is advantageous that a single network connection is used for both connections. Furthermore, it is advantageous that the infotainment system cannot show critical messages to the driver, ransomware messages, fake road and car data etc.

In the present disclosure we show how systems may be seamlessly unified to the user but kept separate, using a single U/I. A single network connection is used for all communicating systems. The display is monitored for identifying a system displaying expected data that another system should be displaying. The display is also monitored for things such as ransom wares. The display can then block such unwanted display and return the system to a known state.

In some embodiments the display may be used as a communications means between systems while keeping the systems separate. For example, display data can be used to communicate device A status to another device B in a single direction A->B, without the ability of device B to infect device B with malware. This status communication may be a continuous one, using the display data of A into B. Similarly, device B display or parts of it may be shared with device A. This separation may allow identifying unwanted behavior and acting upon the data such as returning a device to a known state. This may also allow communicating certain working procedures between the systems.

The implementation of display based communication or display combination may take place in different manners, depending upon the requirements. Communication may take place using a single chip that has separation mechanisms such as ARM TrustZone, Intel Management Engine and may use isolation mechanisms such as Analog Devices Blackfin secure boot These may use remote desktop in order to communicate with another system. Other isolation mechanisms may use hypervisors of type 1 or 2 or a combination of them to achieve separation with secure path.

In another embodiment, implementing a bridging between the end user and service providers bypassing the user potentially infected device in order to bypass internet connected device attack surfaces. For example, it is possible to use a remote desktop application or a web browser from the user device directly with the server so that the device operating system has no access to the interaction with these services. This technology can be added into a cloud vendor such as Google Cloud Platform or AWS so that various such services as remote desktop for DaaS/VDI and secure web browsing are offered to companies using the cloud infrastructure. This way for example, a company can offer their employees virtual desktops and web apps directly to their devices. It is also possible for entire web services to be offered through this service, such as Google Apps. Furthermore, it is possible to offer various companies the ability to offer these services to end users, such as banking applications, payments applications, medical applications, legal applications etc.

Reference is now made to FIG. 1A, which is a block diagram illustration of a user device connected to a secure device which is connected to a display, in accordance with an in accordance with an embodiment of the present invention comprising a user device 102, connected to a secure device 104 which is connected to a display 106. The display has a secure window 108.

The user device refers generally to a computing device such as a tablet, phone, pc, laptop and any other user intractable computing device which has display data as output. The user device 102 transfers some or all display data output to a secure device 104. The secure device may now examine the display data received from user device 102 for certain output display patterns according to a certain required functionality. This display data may be passed on as is to display 106 or may be partly or fully altered or removed.

In some embodiments the secure device may also output display data of its own on the display as window 108 displayed on the display 106. The secure device is preferably having the ability to override display data from the user device so that the secure device image is over and hides the user display in the area painted by the secure device. In other areas it may be see through, partly see through, with partly painted boxes with additional images or text etc.

In this manner we can achieve a separation between two or more components which may interact through display data rather than expose systems into connections which may allow hackers attack surface. Achieving removal or attack surface such as this allows secure systems such as system 104 to work without risk of user device interfering with secure device 104 operations.

Input data such as touch screen gestures, key typing and so forth may be received from the display 106. This is not shown in FIG. 1A. This user input may be then routed to the correct system based on which system window the user touches. For example, in FIG. 1A, if the user makes a touch gesture on window 108, the input is routed to secure system 104 and handled there. If the user makes a touch gesture outside the window 108, this input data is then transferred from the secure system to the used device 102.

This kind of integration between systems is favorable for keeping the systems separated for the removal of attack surface, while the user sees a seamless single system, as well as the ability of the secure system to filter, block or make changes to the display data arriving from the user device.

The importance of the ability to make changes to display data from the user device before it reaches the user may be important in several cases. For example, suppose a critical operation is taking place, such as driving. A user device which may be connected to the internet, may display problematic content to the user which may mislead the driver, divert their attention or shock them. For example, the user device may fake messages coming from crucial vehicle systems, prompting the driver to stop immediately. The user device may show a ransomware message in the middle of driving. Such messages, which may be identified and blocked by the secure system can solve different situations as they happen as well as revert the user device to a known state and solve these kind of issues. Such reverting of user device may be carried out by a certain control from the secure system to the user device for one or more means of reverting a user device to a known state, either by stopping certain programs, rebooting or even returning to factory settings and wiping out current storage.

The means of identifying unwanted display to the user may be by any means possible, such as identifying text and images, OCR and AI based image similarity findings and combinations of these etc. There are many ways of scanning displays, images, videos and any way possible including machine learning can be used as a set criteria for identifying unwanted display content.

Some of the features as presented are a unified display with separation between systems, removal of attack surface, identifying and filtering display data from the user device and returning the user device to a known state.

Therefore we can have a single unit with a filtering means of its display and modification of the display. This may be done preferably through a separated unit, either hypervisor, TrustZone separated executing unit or a separate physical unit. The separated unit may have features of its own to output data to the display and this way we gain a separation between the systems. Furthermore, the user system may communicate data through its display output to the separated unit. A computing device may be defined as part of a portion executable by the above technologies i.e. TrustZone, hypervisor etc. Each of these computing devices, either physical or virtual may connect with a network through ac/dc net in order to form a secure, separated communication channel.

Figure 1B:
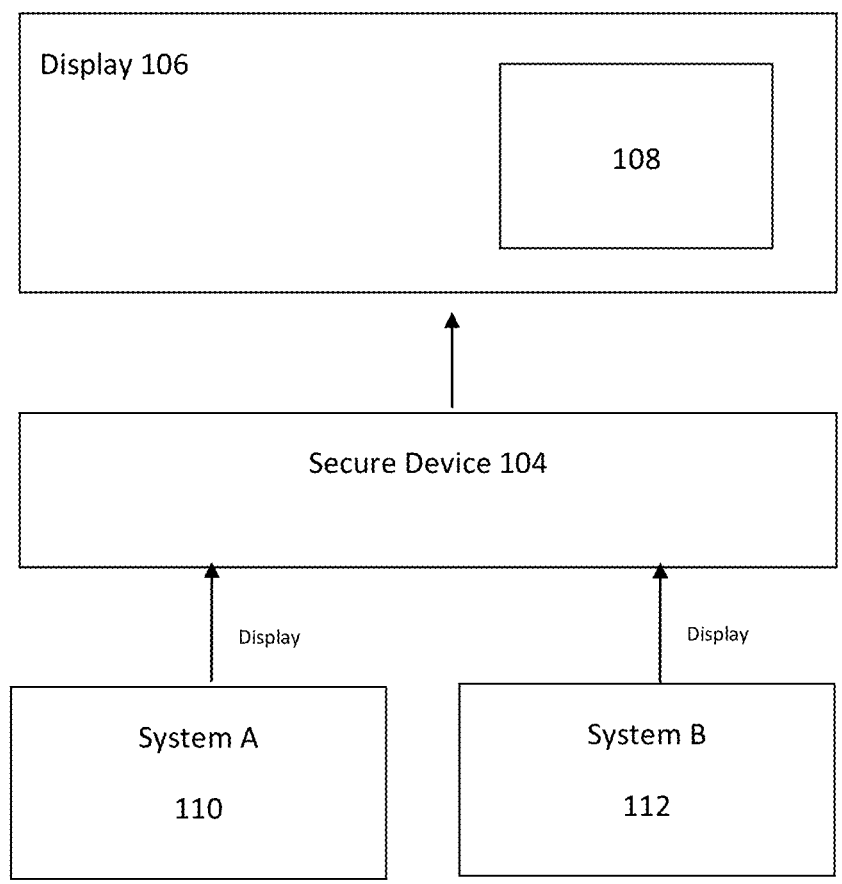
FIG. 1B is a block diagram illustration of two systems connected to a secure device which is connected to a display, in accordance with an embodiment of the present invention.

Reference is now made to FIG. 1B, which is a block diagram illustration of two systems connected to a secure device which is connected to a display, in accordance with an in accordance with an embodiment of the present invention comprising a system A 110 and System B 112, connected to a secure device 104 which is connected to a display 106. The display has a secure window 108.

The system A 110 and system B 112 may be a user device as system A and a critical system such as vehicle controllers, industrial controllers, IoT controllers etc. These two systems may be separated but displayed together to the user. The secure device 104 may function as a system in itself which may display a window of its own on display 106 such as window 108 or in an embodiment may be a display combiner, in which case the secure display 108 may belong to system B. As in FIG. 1A, input from the user such as touch input may be sent to the correct system based on the location on the display that the user inputs or touches and the system that is currently on the display where the user touches.

Based on the current displayed image on the display secure device 104 can tell which system outputs the display and whether that display is appropriate to the system the display is coming from This identification phase may allow filtering of display content and for setting a system to a known state as a result of unwanted behavior.

System A and B may communicate through display data such as in a single direction from A to B. System A and B may communicate with the secure device 104 through display data so that separation between systems is kept. Communication may be one way or two way.

Communication from secure system B may take place by secure device 104 receiving in a one way communication manner display data from system B and finding necessary display data for receiving certain data from system B. In some embodiments the display data screen resolution may be larger than actually displayed to display 106, some of which may be used for communicating data. For example, sending speedometer data, breaking data and so forth.

The display 106 may include windows from each system so that display is unified while the systems are separate.

Figure 1C:
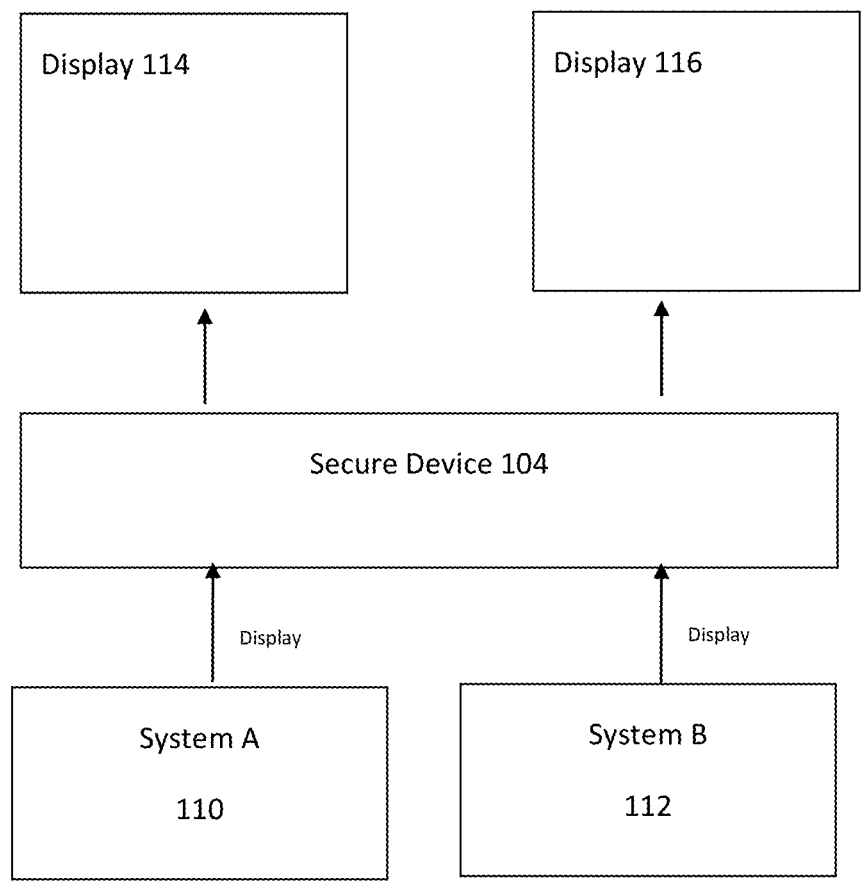
FIG. 1C is a block diagram illustration of two systems connected to a secure device with two connected displays, in accordance with an embodiment of the present invention.

Reference is now made to FIG. 1C, which is a block diagram illustration of two systems connected to a secure device with two connected displays, in accordance with an in accordance with an embodiment of the present invention comprising system A 110 and System B 112, connected to a secure device 104 which is connected to a display 114 and to display 116.

System A and System B may communicate through display data with the secure device and with each other. The display data may include windows from each system so that display is unified while the systems are separate.

Figure 1D:
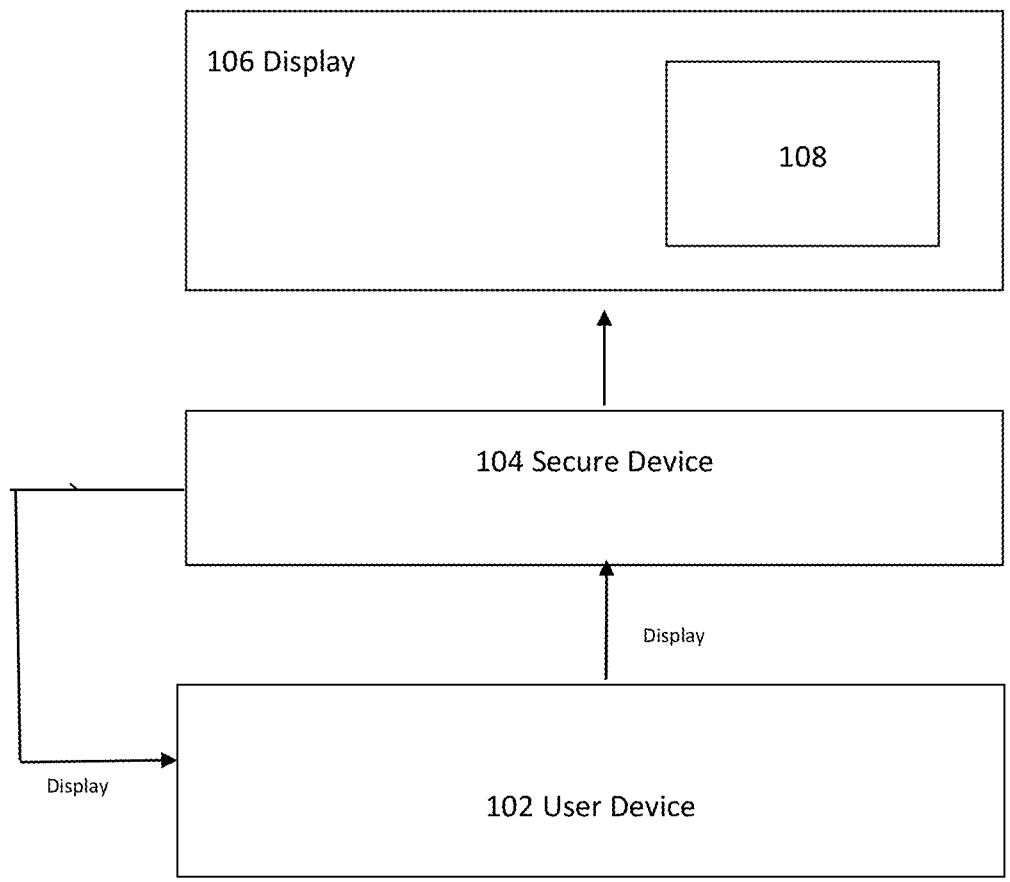
FIG. 1D is a block diagram illustration of a user device connected to a secure device that communicates display data with the user device, in accordance with an embodiment of the present invention.

Reference is now made to FIG. 1D, which is a block diagram illustration of a user device connected to a secure device that communicates display data with the user device, in accordance with an in accordance with an embodiment of the present invention comprising the components of image 1A and in addition to FIG. 1A there is a display output from secure device 104 to the user device 100 in addition to the display output to display 106.

The display output from the secure device to the user device may include display data as is sent to the display and in some embodiments may include extra data that is not displayed on the display but is external to the display. This way, the secure device is able to communicate with the user device in a one way manner and output to the user device data that should be transferred to the user device but with the separation between systems kept.

The user device also passes display data to the secure device. As for the above case, the display data may include data that is extra to the data that will be displayed on the display, such as data in resolution outside the display.

In this manner systems may communicate while kept separated from any networking protocols and any potential malware that may travel through such connections.

A mechanism for rebooting, resetting or restarting may be added from the secure device to the user device in order to allow returning to a known state, such as by booting from secure boot. This step may take place for example, when a set criteria for removing part of the display is met, immediately or after some time, or after some recurrences. This may also take place when it is more appropriate such as when the device is not in use. A set criteria may mean one of several cases that match a requirement, an AI engine findings, an OCR of some text or a combination of these, and so on, including any kind of rules or machine learning tools and their combinations.

In another embodiment of FIG. 1D is a user device 102 with an intermediate device 104 between the user device 102 and the display. Its role is to separate direct access of user device to the display and in some embodiment input means. This manner of controlling I/O by a separate entity allows control of the user device such that display output may be monitored and also compared with expected outcome. In some embodiment input may be monitored and compared with input arriving into the user device, for example by repeating the input and returning it into device 104. If the device 104 is independent and has access to networking means, it may compare scenarios and identify issues the user or software installed on the user device 102 may not discover.

Furthermore from FIG. 1 it is shown how different systems may be kept isolated but display together on the same display and seem like a single seamless device. In addition to the single display, a single input device such as a touchscreen and other input and output devices may be used for both systems as is explained in the ac/dc net I/O switch, FIG. 1D in application Ser. No. 15/376,641.

Each system in FIG. 1, such as user device, secure device, system A, system B may communicate over the network with another system. For example, a user device may be connected to the internet and communicate with a remote server over the internet. The secure device may communicate with a secure server using an ac/dc adapter which keeps its isolation from ac devices yet allows it to communicate with the secure dc server.

The communication between the user system and the secure system which is based on the display data allows a one way communication for specific data. Only a portion of the display may be communicated, some of which, or all of which, may not be visible to the user.

In some embodiments, the display output used in this embodiment may be changed or added to by other output means.

A system such as the user device may be displayed through a remote desktop or similar technology, used from another system, so as to keep isolation between the systems. VDI may also be used with remote systems such as in the cloud.

Figure 2:
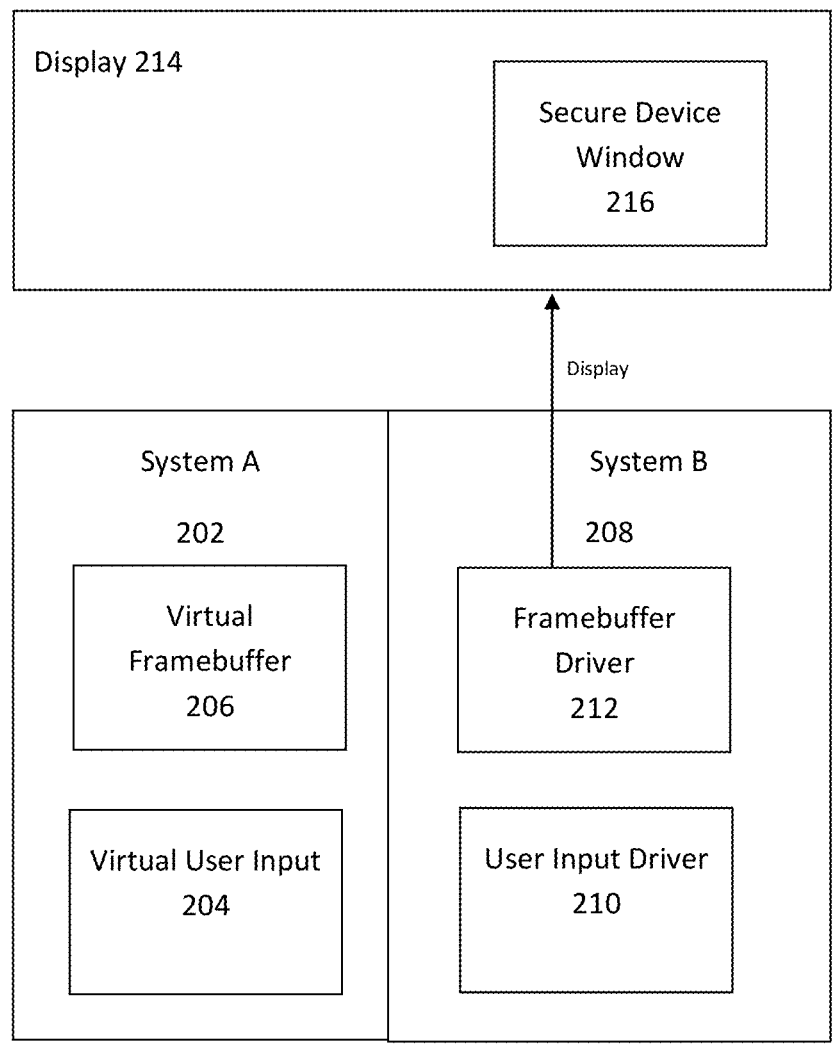
FIG. 2 is a block diagram illustration of two systems on a SOC with separation mechanisms connected to a display, in accordance with an embodiment of the present invention.

Reference is now made to FIG. 2, which is a block diagram illustration of two systems on a SOC with separation mechanisms connected to a display, in accordance with an embodiment of the present invention comprising a system A 202 and System B 208. System A will be considered as a user device, System A comprises virtual user input 204 and virtual framebuffer 206. The virtual user input acts as a user input which does not control the input device. The virtual framebuffer acts as an output display data which does not control the framebuffer device.

System B 208 will be considered to be a secure device. System B comprises user input driver 210 and framebuffer driver 212. The input driver has control over the input device and the framebuffer driver has control over the framebuffer device.

System B connects to display 214 through the framebuffer driver 212. System B displays a secure window 216 on display 214 that does not pass through system A.

One such system where this could take place is an ARM chip with TrustZone securing capabilities where system A runs as a normal world and system B runs in the secure world.

Virtual frame buffer flows into the secure world into the framebuffer driver, where system B may examine the display data by filtering it and detecting certain behavior according to certain criteria or machine learning, AI, and so forth. Similarly virtual user input from system A goes into system B into user input driver 210. This way secure user input and secure user display does not pass through system A, while system A may be monitored, both by display output and user input to its running applications.

Display data from system B or part of it may be sent to system A for communication purposes. Instead of allowing a communication channel that allows hackers to attack a system, a one way communication channel made by sending output display data can be used. A certain area in the display may be set for communication, which may be separate from the actual data displayed to the screen or part which may be off screen. System B in secure mode may write to system A non-secure memory for this communication to take place.

Similar setup may be made using hypervisors rather than ARM TrustZone, where for example, a level 1 hypervisor is installed which controls the display and input devices as system B, and a level two hypervisor is installed as system A. It is however worth noting that hypervisors are not security tools but were made for other purposes and also that they have a large attack surface, that they may be vulnerable to attacks by Meltdown and Spetre on some CPUs and by other means which are not yet known.

This fig. displays how a setup of two separated systems may be implemented on a single chip or a single system.

Figure 3A:
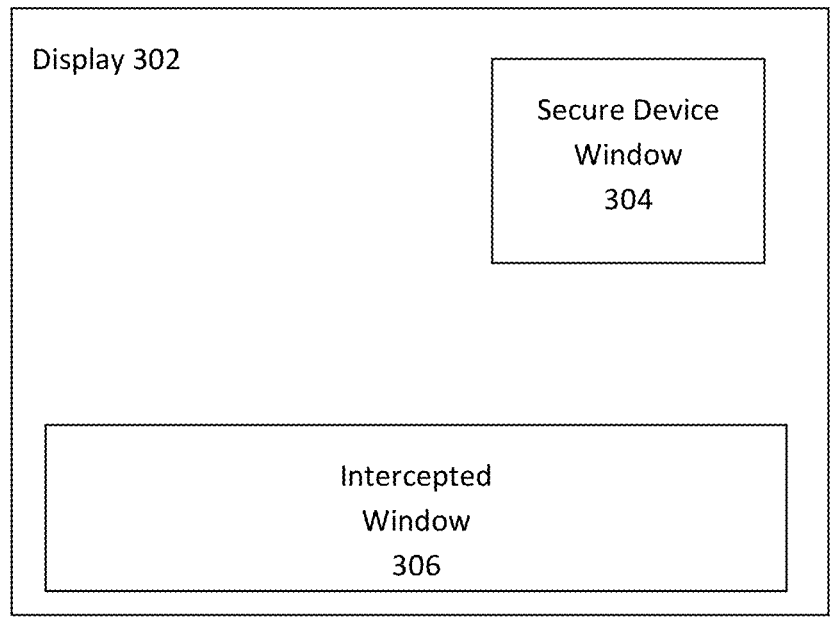
FIG. 3A is a block diagram illustration of a display with an intercepted window, in accordance with an embodiment of the present invention.

Reference is now made to FIG. 3A, which is a block diagram illustration of a display with an intercepted window, in accordance with an embodiment of the present invention comprising display 302, a secure window 304 and an intercepted window 306.

The intercepted window is a window that fits into the cases where certain data is to be blocked from the user from seeing it, when this kind of image data arrives from that certain system it arrives from. For example, if a system A which is not secured such as an infotainment system in a vehicle displaying an engine overheat warning or some other misleading message that should not come from the infotainment system.

A display manager may be applied for following the displayed data each moment and checking with the expected display to identify differences in behavior of display and based on the displayed data arriving from each system, checking if the expected data displayed from a system is expected from that system. This may mean both, displaying of a secure system from a non-secure system of a non-secure system displaying different data to what should be displayed.

The intercepted window is identified as an unwanted window in FIG. 3A which is then hidden from user view or some other handling may take place such as system reboot for the rogue system.

Figure 3B:
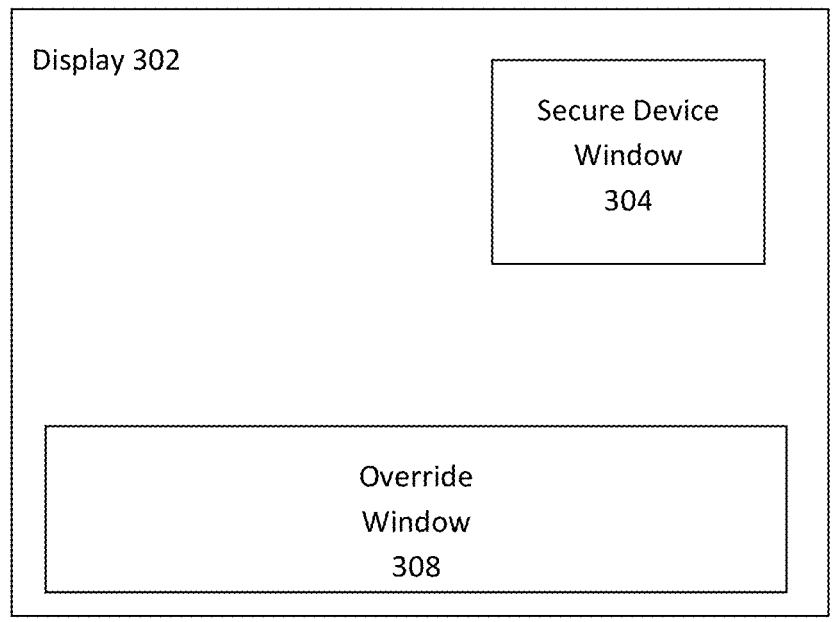
FIG. 3B is a block diagram illustration of a display with an overridden intercepted window, in accordance with an embodiment of the present invention.

Reference is now made to FIG. 3B, which is a block diagram illustration of a display with an overridden intercepted window, in accordance with an in accordance with an embodiment of the present invention comprising display 302, a secure window 304 and an overridden intercepted window 306.

Following the identification of the window as a window unwanted to be viewed by the user for various reasons, the window or part of it may be overridden so that the image is not displayed to the user. This may be done by the system B in FIG. 2 or the secure device 104 in FIG. 1 which may have a priority in display data over system A data.

Some of the reasons for removing a part of the display from the user may be system impersonation, a shocking content such as a ransomware note and so forth. Returning the system to a known state such as a reboot for the unsecure system with preferably secure boot capabilities is a possible outcome following the blocking of the image and deciding the problem persists and is real.

In FIGS. 3A and 3B there is a certain criteria defining what kind of display data is to be blocked from the user. This criteria may depend on the current situation of execution, the type of data arriving from each system or types of images or text. This criteria may depend on the system and the situation. The data that hides the unwanted display part may depend on the other parts of the display. It is preferable that the parts that hide the display have precedence over the displayed data so that the unwanted data is overridden without modifying the system that has a criteria match for hiding display data. This is preferable for several reasons, for example, not to give feedback to hackers. Following such identification the system may be forced to reset or revert to a known state.

Figure 4:
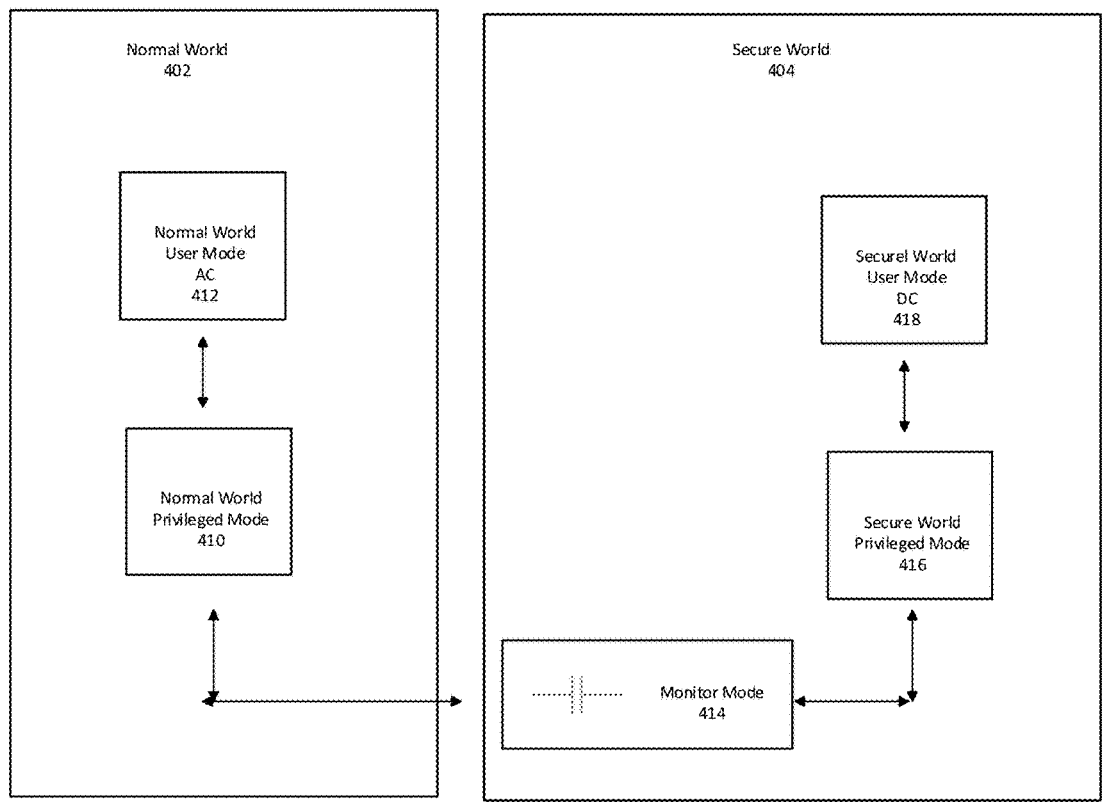
FIG. 4 is a block diagram illustration of the modes in an ARM core implementing the secure extensions used for implementing the user device and secure device, in accordance with an embodiment of the present invention.

Reference is now made to FIG. 4, which is a block diagram illustration of the modes in an ARM core implementing the secure extensions used for implementing the user device and secure device, in accordance with an embodiment of the present invention comprising normal world ARM processor mode 402 and secure world ARM processor mode 404.

The normal world 402 includes normal world privileged mode 410 and normal world user mode 412 used for user device implementation, also referred to as ac operations. The secure world 404 includes monitor mode 414 used for the separation between user device and secure device also referred to as ad/dc adapter. The secure world privileged mode 416 and secure world user mode 418 are used for the secure device, also referred to as dc.

The monitor mode, used to switch between worlds is a special processor mode as described later. The monitor mode is connected to the normal world privileged mode 410 which is connected to the normal world user mode running user device or ac. The monitor mode 414 is connected to the secure world privileged mode 416 which is connected to the secure world user mode 418 used for secure device or dc operations. This way it is possible to implement a user device and a secure device with a separation mechanism that allows connection features as is referred to as ac/dc net device, on a single ARM chip utilizing both worlds and the monitor mode which stands in between them. The privileged modes assist in the separation, for example the secure world privileged mode which may help isolate the monitor from the user device or dc application.

Figure 5:
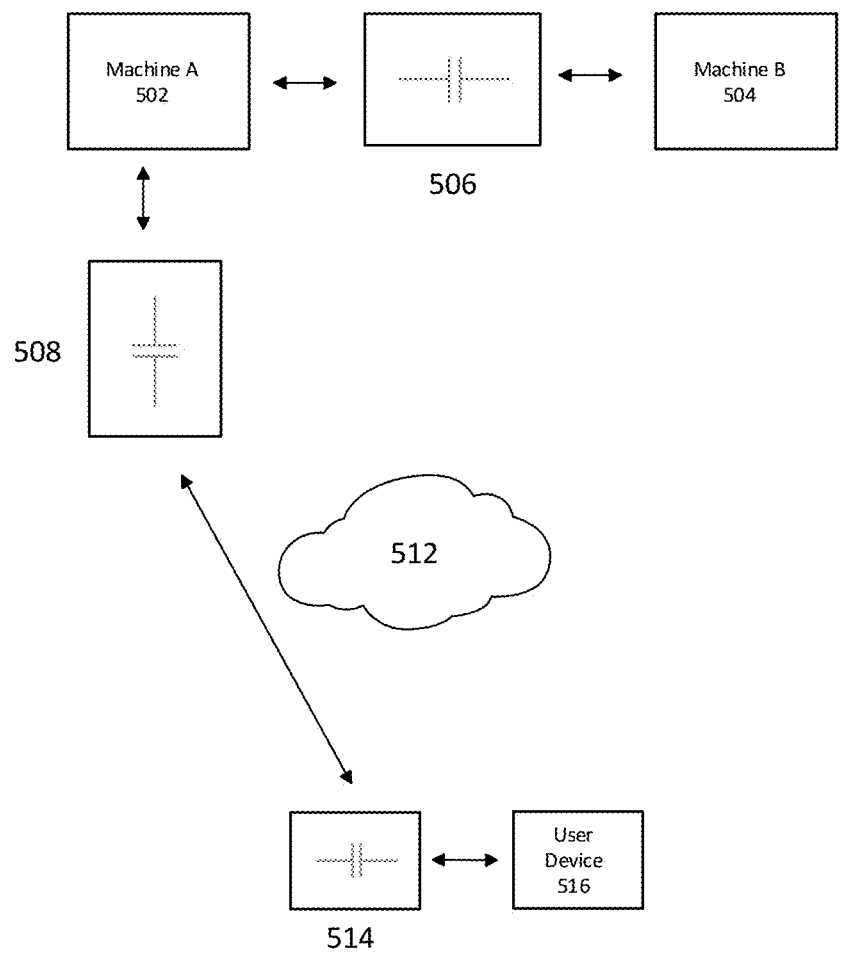
FIG. 5 is a block diagram illustration of building blocks for defining and planning a system security layout, in accordance with an embodiment of the present invention.

Reference is now made to FIG. 5, which is a block diagram illustration of building blocks for defining and planning a system security layout, in accordance with an embodiment of the present invention comprising machine A 502, machine B 504 and a user device 516. Machine A and machine B communicate through a machine-to-machine separation unit 506. Machine A communicates with user device 516 through user-to-machine separation units 508 tied to machine A 502 and 514 tied to user device 516. A network lies between user-to-machine separate units 508 and 514.

The building blocks for machine to machine and user to machine separation units allow for defining and planning a system security layout. The building blocks are network disconnection modules allowing pre-defined user to machine and machine to machine interaction.

The building blocks provide a provable secure model for functional user and machine interaction. The building blocks allow unique flexible and straight forward approach to security, separating devices and removing network access from certain devices. The result is simplifying security through the introduction of separation units that isolate system devices while allowing specifically defined interaction that keeps the separation.

User to machine devices allows user to control secure isolated devices through the same device as their user device while maintaining system isolation. In one embodiment, machine to machine devices allows predefined types of messages between systems. In another embodiment, machine to machine devices work by output passing, such as for example, passing display data from one system to the other.

In this manner it is possible to use the modules to plan and define a system security layout.

Figure 6A:
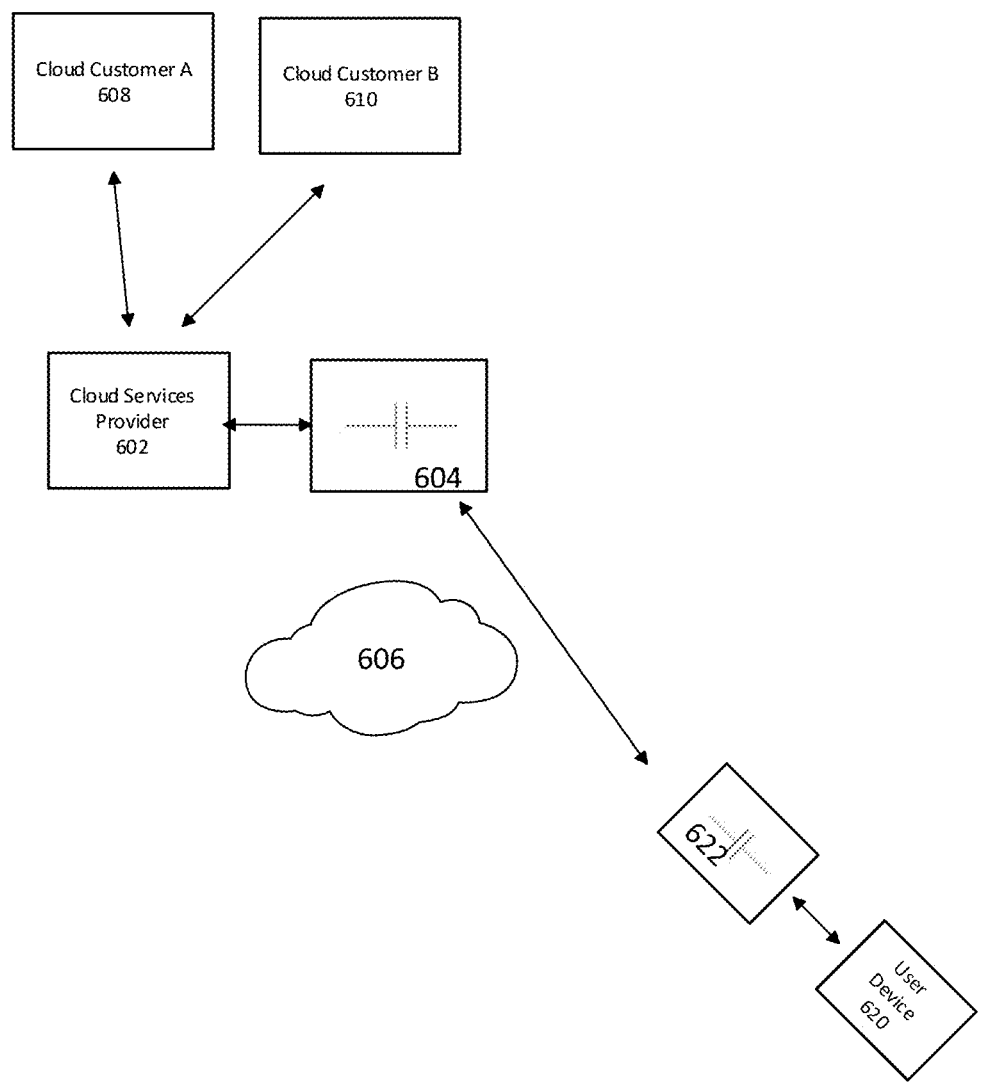
FIG. 6A is a block diagram illustration of a cloud service provider for providing customers with secure services for their respective users, in accordance with an embodiment of the present invention.

Reference is now made to FIG. 6A, which is a block diagram illustration of a cloud service provider for providing customers with secure services for their respective users, in accordance with an embodiment of the present invention comprising cloud services provider 602 connected to a combined disconnection unit 604 implementing an ac/dc adapter with non-extractable keys located in cloud 606. The combined disconnection unit 604 is configured to communicate with user device 620 through used device combined disconnection unit 622 using its ac/dc adapter non-extractable key.

The cloud service provider provides cloud services to several customers on its cloud platform, such as cloud customer A 608 and cloud customer B 610. These cloud customers are using the services of the cloud service provider 602 to offer their users services that are based on the ac/dc net capabilities of the cloud service provider.

Services using this capability may include a remote desktop capability for a DaaS/VDI solution that works as follows: The user uses their device to remotely connect to a desktop on the cloud with the ac/dc net system on the cloud platform that has the ac/dc adapter in place configured to securely communicate with the user machine, either with the user non-extractable key or a matching relevant key to match the user's keys to offer a secure connection.

With the user device blocking I/O from the ac user device, it is as if the user is sitting in the cloud platform itself thereby offering secure remote desktop.

Another service that may include this capability is a secure web browser. The user opens an application that opens a browser in the dc part of their device with the I/O secured from the ac part. The communication is secure to the cloud service provider with its ac/dc net infrastructure as explained above. The cloud customers may get a service to provide web services to their users in a way that is secure from ac.

Another service that may include this capability is a secure application. The user opens an application in the dc part of their device with the I/O secured from the ac part. The communication is secure to the cloud service provider with its ac/dc net infrastructure as explained above. The cloud customers may get a service to provide secure communication with their app to their users in a way that is secure from ac.

This way, a cloud customer receives services from the cloud services provider that utilize the cloud service provider ability to communicate securely with the user and to prevent any type of attack from the ac part of the device, including screen scraping and key logging.

A cloud services provider may now give such services to their customers, opening capabilities that are usually not built by smaller scale companies, as a service. This may be referred to as ac/dc net as a service.

Figure 6B:
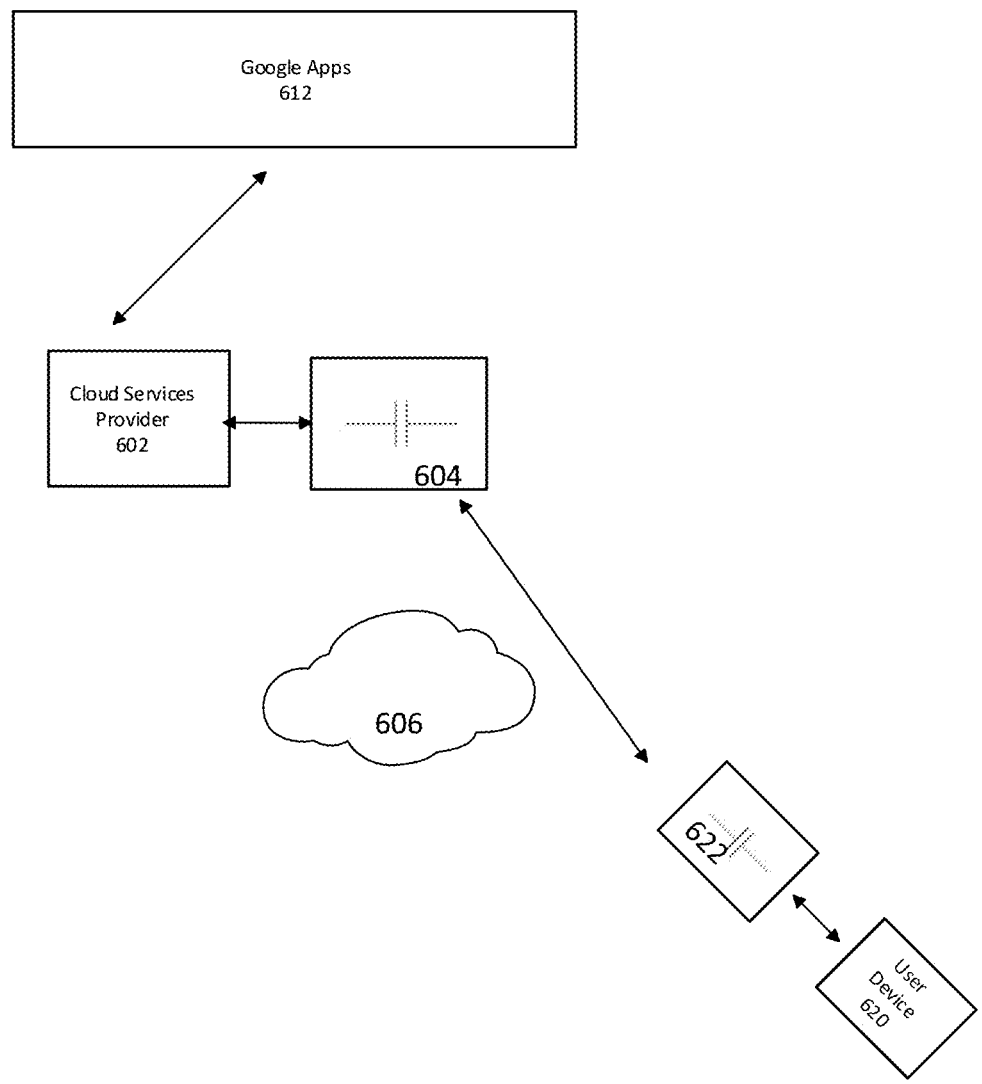
FIG. 6B is a block diagram illustration of a cloud service provider for providing a general user based service with a secure service for their users, in accordance with an embodiment of the present invention.

Reference is now made to FIG. 6B, which is a block diagram illustration of a cloud service provider for providing a general user based service with a secure service for their users, in accordance with an embodiment of the present invention comprising similarly to FIG. 1A cloud services provider 602 connected to a combined disconnection unit 604 implementing an ac/dc adapter with non-extractable keys located in cloud 606. The combined disconnection unit 604 is configured to communicate with user device 620 through used device combined disconnection unit 622 using its ac/dc adapter non-extractable key.

The cloud service provider provides cloud services to general user based service 612 on its cloud platform. This cloud service is using the services of the cloud service provider 602 to offer their users services that are based on the ac/dc net capabilities of the cloud service provider.

Such general user based service may include Google Apps, search etc., which builds on the capability of the cloud service provider to close the last mile to the user so that security wise, it is as if the end user is located on the cloud premises using cloud premises devices. This is favorable if this is the same company, namely Google Cloud Platform and Google Apps.

Other such general user based services may include Ebay, Paypal, Social media and others. These services may offer their users secure ways to use their services as if their users are working on the cloud premises using cloud premises devices.

To list the cloud services that can be served as a platform using the technology:

We have a secure remote desktop as a service or installed at an IT VDI, so on the endpoint we have a secure remote desktop solution and on the service side we can call it secure DaaS or S-Daas for cloud and S-VDI for VDI;

We have a secure web browser on the endpoint and on the cloud we have a secure web as a service, S-WaaS;

We can also have in place a system for IoT devices and also smart vehicles. IoTaaS-IoT as a service. Each IoT device works with the server using the non-extractable key. The server allows direct connections to a group of other IoT devices only, to communicate among themselves as well as with a server. In some implementations the addition of a n IoT as a member to the group may have a certain sequence using a special authorization. Same is relevant for vehicles for example, which have many IoT devices. The server can monitor and check the IoT group and only a close group may communicate among themselves.

We can also have a secure web app as a service. We can have a secure app as a service this way, for example a mobile app—this data and interface to user can generally be an app such as a phone app for banking, gmail etc.

This way the technology becomes a platform for serving isolation and separation from the ac (internet accessible domain) and preferably from other dc apps and instances. This should not be a limitation if one decides to remove some of the isolation for any reason, the technology may allow it.

The present disclosure furthermore includes several embodiments that can be realized for implementing ac/dc net and other bridging technologies on certain types of HW architectures and devices communicating over the internet. In this disclosure, these HW and devices are defined and described. The devices can communicate with no internet attack surface over the internet using a server framework operating with no internet attack surface from end user device to server, to offer support for many of the applications over the internet such as user authentication, email, chat, payments, purchases, document sharing, cloud applications, financial applications, medical applications, business applications, IoT, Vehicles web browsing etc. Content including ads is supported for delivery over the internet with no internet attack surface using these devices.

The reference to ac/dc net is relevant to the language of U.S. application Ser. No. 15/376,641 referred to as the secondary application, Heres a short description but its entirety should be taken from the secondary application.

An isolated dc device is configured to communicate with a dc server over the internet with no internet attack surface. The dc device may connect to a dc terminal for a user to communicate with the dc device in a way that is isolated from devices that connect to the internet, referred to as ac devices. A dc device and a dc terminal may be implemented as part of an ac device and in some implementations the dc terminal uses the same terminal of the ac device in part or in whole.

The communication between the dc device and the dc server may take place through an isolating device referred to as an ac/dc adapter. The dc device connects to the ac/dc adapter which in turn connects to an ac device connected to the internet. The ac/dc adapter separates the dc device and isolates each dc instance from other dc instances. In some embodiments the ac/dc adapter is paired with the dc server upon manufacturing.

When referring to a user device, a Chromebook for example, may be equipped with an ac/dc net adapter, in SW only or with some additional HW, for example and ARM based device may implement the ac/dc net in its CPU providing necessary features such as fuses (One tie programmable memory). Laptops, PCs based on Intel CPUs may implement either inside or with an additional device. Smartphones, tablets, watches may also implement the technology such as for any digital device.

Throughout this disclosure, terms that are limiting should be also allowed in another implementation to be less limiting for example, a non-extractable key can in some embodiments a key that is preferably non-extractable. A dc device may connect to a network that is directly received through data secured with the key that is preferably non-extractable. This is so as to broaden the scope of the disclosure. Although the explanation of the preferred embodiment may be very limiting, other embodiments may be more loose and allow flexibility so as to broaden the scope of the disclosure and let the claims define the scope of what is claimed.

Ac/dc net implementation on ARM TrustZone is now explained. Implementing ac/dc net and other bridging technologies on the ARM TrustZone technology may be done is several ways with no additional HW. TrustZone offers 2 processor states which look like 2 separate physical CPUs in hardware. See also FIG. 4. These processor states known as normal world and secure world will be translated to ac for normal world and dc for the secure world. This still leaves out the ac/dc adapter which stands between the two worlds.

The TrustZone implements in HW a special processor mode called monitor mode that is a gatekeeper that manages the switches between the secure and non secure processor states. In some embodiments this gatekeeper is utilized for the ac/dc adapter.

The monitor mode is preferably very fast to make the context switch and so the functionality of the ac/dc adapter may be minimalistic. The ac/dc adapter calls for the initialization of the dc application or optionally entire world or part of it (it may be unnecessary to restart all if using hash checks on some memory regions and initializing some data) with optional input file that is encrypted for this device secure mode. The adapter checks this is so and moves into the secure world with a call to initialize the requested application with the input file that is decrypted and checked with hash signature.

When the application finishes it prepares the output file and encrypts it for the dc server. It then calls the monitor which checks the file is properly encrypted and then resets the application or other executions to the starting point, transfers the encrypted file to normal world accessible memory and returns to normal world mode.

Protection of secret keys used for encryption is preferably done using a HW crypto accelerator that includes the keys within it so that these never leaves it. This crypto accelerator is preferably only accessible in the secure mode of operation. This way dc apps cannot take the HW key out or any other information from other instances, assuming restart for each app.

The memory of the monitor mode, either code and data may be protected using the privileged and non-privileged modes of execution supported in HW. The privileged mode may map the memory seen by the non-privileged mode without the memory used by the monitor.

Other helpful possibilities for the adapter implementation may include using a TEE such as OP TEE to manage. Others include the processor user mode and privileged mode separation as well as CP15 lockdown features as well as other helpful HW mechanisms enabling to lock down memory locations.

Other ways of implementing the ac/dc adapter may be using a JVM which allows for separation required Another way of implementing the adapter or a technology as above is using JVM, JVM can ensure memory protection such as to protect monitor code and data. In another embodiment a JVM with a built in virtual memory management to further protect the monitor see patent on virtual memory JVM implementation U.S. Pat. No. 7,886,363 by the present inventor incorporated herein.

Note that protecting the monitor may also take place using the different processor mode. For example, in the dc part running on the secure world, an application may be executed in user mode (non-privileged mode).

TrustZone needs to interface directly to the user to bypass display and keyboard data and in some embodiments as well as other I/O. This is done by having the secure world run device drivers for the I/O and in some cases only in the secure world are drivers to the I/O devices. In such case ac apps may transfer I/O through to the secure world.

This way a dc app has access directly to the user not going through the ac part which may be a regular OS.

A totem image may be displayed in dc to tell the user the system is in dc mode, or a window is in dc mode, as explained in the initial and secondary applications.

Therefore it is possible to implement ac/dc net on ARM processors with TrustZone.

Ac/dc net implementation on Intel platforms is now explained. Implementing ac/dc net and other bridging technologies on Intel platforms may be done using GSX which forms an enclave for implementing the adapter. This enclave can protect code and data as required by the adapter. A dc implementation may be executed as part of another enclave for example, and the adapter restarts the dc enclave each time.

The SGX enclave needs to interface directly to the user to bypass display and keyboard data and in some embodiments as well as other I/O. Regarding display this may be done using Intel Identity Protection Technology (IPT) which has a Protected Transaction Display (PTD) mechanism.

This actually works by the having another processor that runs a JVM on top of a small OS. This separate processor has direct access to the display and can show an image not existing for the main processor.

By tying the display of the PTD to the SGX enclave mentioned above (or another one which communicates to the enclave) it may be possible to achieve a secure path to the display for the ac/dc net as well as the adaptor and the dc.

The thing that is missing is a secure path for the keyboard. This may be accomplished by a small adapter between a connected keyboard and the device or by a secure docking station. These will be discussed further on. These may intercept the keyboard and in some embodiment also mouse clicks and/or movements. This data may then be encrypted and communicated to the SGX enclave.

There may be other ways of securing the keyboard path through HW. This may be implemented by another processor that has direct access to a USB the keyboard connects to that can interface the keyboard (and similarly mouse) separately from the main CPU. This separate processor may then be used through SGX to connect to ac/dc net.

A totem image may be used on the dc display to signal the user that this display is indeed the display of the dc rather than a fake. The other parts of the system will be tied to this dc display. A totem image may be displayed in dc to tell the user the system is in dc mode, or a window is in dc mode, as explained in the initial and secondary applications.

Please note a JVM and a JVM with built in virtual memory management may assist in the implementation as discussed above.

Please note that ac/dc net may be implemented without SGX and using only the ME processor by Intel.

Display and keyboard may be paired together for Intel platforms. In certain cases it may be required to tie or pair together the secure display and secure keyboard together and to let the user know the current mode is a secure one where the display or part of the display and the keyboard (and optionally mouse clicks and even in some cases movements)

are all secure together for using a certain app. This may be done using a totem image/totem indicator as explained in the initial applications.

It is the intention of the present application to overcome all that is missing from an Intel based platform to offer a fully operational ac/dc net environment and these mechanisms may be generalized to other uses if required and are not limited to ac/dc net implementations.

Therefore this application teaches a secure path for keyboard and optionally mouse for interfacing with an SGX enclave or other parts of a sub system such as Intel IPT.

A possible implementation may be a specific USB port or ports that are dedicated for possible secure path. All USB ports may be extended to such paths. Each such USB port may be switched (such as an IO switch) between secure and non secure path so that for example a keyboard may function as it normally does for a standard application while for a secure path application it is switched so that the secure path does not pass through the main CPU and is instead directly switched to another processor that received the keyboard and optionally other input devices such as mouse, camera etc. Regarding mouse it may be possible to intercept only the mouse clicks and transfer the mouse movements to the normal CPU.

The other processor may then handle the keyboard and other input devices and optionally be allowed to connect to an SGX enclave and securely transfer the input and optionally receive output to and from the enclave.

The totem image or totem indicator such as sound or other indication, may be used to show that the current application is secure. This is important for the user to know that what seems secure on the display is actually secure and not an attacker mimicking a secure application.

In this way it is possible to implement ac/dc net on the Intel platforms. In some embodiments a SW hypervisor such as Zen, KVM etc. may be used in order to form a secure path to the keyboard, as well as other I/O such as display and mouse. The hypervisor may also connect to SGX enclaves and also form the dc environment. Although this is a possible implementation, it is not preferable as SW is prone to attacks and a SW hypervisor has a large attack surface, making it a less favorable option. In general a hypervisor may be used for other parts of the implementation as well.

In some embodiments Two Screens may be used. In some embodiments, an ac/dc net implementation may be implemented using two different screens. This is utilizing for example, mobile devices with a large display and another small separate display sometimes used for displaying device info when the main display is shut off as well as to complement the main display when it is turned on. Another example is a vehicle with two displays.

In some embodiments the two displays may each be either in secure dc mode or in non secure ac mode. In other embodiments one of the devices may be only in dc mode. In the first case where each display may be either in dc or ac, each display may display the totem image or only one of them, while one display such as the main display shows the user the main dc app and the second display show the totem image constantly or sporadically. The exact implementations may vary but the important thing is for the user to know the current application is a secure dc application. This can be communicated using the two displays.

In some embodiments one full display is used. In these embodiments one display is used and the entire display may be in either ac mode or dc mode. A totem image or some other indication may be used to let the user know in which state the application is in and the entire display is used as either ac normal application or dc secure application. In some embodiments if a full screen is used the totem image is always shown in a certain place on the screen, alone or in the background.

In some embodiments a secure docking station is made to implement ac/dc net. A secure docking station for connecting to a device such as an Intel device as well as other devices, for implementing parts or ac/dc net in full. Such a docking station may interface any I/O such as a keyboard, a mouse, a camera, a printer a display such as through USB 3.0 etc.

In some embodiments this docking station only includes one device or two devices and may be small such as a small device between a keyboard and the PC; between a keyboard+mouse and laptop; between a USB keyboard and mouse dongle and PC etc.

Such a docking station may be able to receive input in dc and output to dc domain as well as to communicate to dc apps on the device. It is favorable that communication to ac apps are carried out as normal ac devices to the corresponding app.

In a simple embodiment the docking station includes a device capable in working in dc mode such as an arm based device with TrustZone capability with different I/O connections. The docking station device connects to the user device such as laptop, tablet, phone, PC etc. through Bluetooth, Wi-Fi or USB for example. In a preferred embodiment the docking station is capable of connecting with the user device for standard ac world tasks as well as for dc secure apps. The docking station is aware of the kind of app that is currently running and focused, if it is in ac or dc, and accordingly communicated I/O as required for that app. As mentioned earlier this may be done using SGX or other manners for dc. This may be done using a connection to an external server as well. This may be referred to as an I/O switch, switching I/O between the ac domain and the dc one.

In some embodiments a VDI, DaaS and Secure Remote Desktop are implemented using ac/dc net. A Virtual desktop infrastructure (VDI) is used by IT to simplify IT management as well as to allow BYOD and to work from anywhere. DaaS (Desktop as a Service) allows cloud vendors to offer such services by offering it as a service instead of buying, installing and maintaining it.

In both of these cases there is a requirement for authenticating to the service, sometimes in several authentication steps.

A major problem is that while these services may be secure on the cloud side, the end user machine may be infected with various malware, allowing things such as screen scrapers, key loggers and other means to view and even control machines within the infrastructure of the company by for example, typing in keyboard keys when the user is away. This puts the entire organization network at risk of attack.

Using ac/dc net device it is possible to solve all of these issues as follows: The device authenticates to the server using its non-extractable key, making the use of authentication redundant, thereby tying the device to the company platform. Note a fingerprint reader or secondary password may still be in use, such as for using the device as a whole or also for using the VDI client.

Most importantly, running a remote desktop application as a dc application on the user device does not allow an attack to screen scrape (take screenshots), log the keyboard and optionally mouse clicks and does not allow to insert keyboard typing, as well as optionally other capabilities like prevent network sniffing.

This capability is leveraging on the ability to use the user device I/O devices with ac/dc net without the user device (ac) reach. The ac/dc net has a key that is non extractable and optionally that key may be used to establish a VPN connection with the cloud server. In another embodiment the non-extractable key is used to directly protect data such as frame buffers and keyboard entry. This secure data is then passed to the cloud server to be used for the user session. In another embodiment a VPN connection is used and on top of the VPN connection, the non-extractable key is used to protect the remote desktop traffic (i.e. frame buffers, keyboard and mouse). Any combination may be used for using non-extractable keys and protocols to transmit data securely between the device and service provider (relevant here and for other applications such as web browsing, secure applications etc.)

In this way the last mile is protected end to end and the VDI/DaaS solutions become secure as if the user was actually working from the servers located at the cloud physically or at the enterprise IT server site.

In some embodiments this may be viewed as a second personality to the user device that acts only as a VDI client with secure I/O and a secure key for authentication.

In some embodiments, encrypting the traffic using an un-extractable key and taking care of the screen and keyboard I/O interception from the endpoint is preferable.

This way a virtual desktop allows running any business application securely without the data ever reaching the endpoint.

This may be viewed as the last mile solution for a secure application that is secure in the cloud. This implementation secures the last mile to the user.

Such a described embodiment may also be viewed as a bridge, for bridging the security of the cloud through to the user.

This way the end user using her device may communicate with a VDI client without the data ever reaching her device. Meaning it is as if she is located at the VDI premises which is as is favorable. Any party trying to eavesdrop or break into the session will only see data encrypted with the non-extractable key, bypassing the trust model, HTTPS, MITM attacks. If authentication is also done using the non-extractable key then this also bypasses social engineering and also no passwords may be used as the device itself may be used as authentication for using the non-extractable key. This point is relevant not only for web but also all other items in this application. This means it is as if she is located at the web server or infrastructure premises which is favorable. Any party trying to eavesdrop or break into the session will only see data encrypted with the non-extractable key.

In some embodiments, the secure VDI is meant to work with VDI as well as DaaS where the former is meant as infrastructure and the latter given to clients as a service while it works similarly.

Using a secure VDI client is not only a secure solution but a platform enabler because if the user may be considered as if she is located at the servers then new options open up for delivering new or much cheaper services that are not offered today precisely because of the insecurity. Such services may be based on different regulation requirements as well as other organizations that are simply refrained from using these services all together.

In some embodiments a secure web browser may be implemented using ac/dc net. A secure web browsing solution is of great value, for example for an enterprise. This is because web is a major way of delivering content, apps, to thin clients and generally to enterprise workers.

The main problem is that while a certain enterprise web application or site (or generally a general site) services may be secure on the cloud side, the end user machine may be infected with various malware, allowing things such as screen scrapers, key loggers and other means to view and even enter data. Securing the web browser is of great value to customers enabling new services that today may not be offered because of the endpoint vulnerabilities. Some of the services that are given to customers are not as they would be if given a secure end to end path between the user and the server.

Using ac/dc net device it is possible to solve all of these issues in several ways. 1) In its simplest form, a web browser is placed in the dc part of the device. Standard web services may be offered like on the regular internet with the only difference that the screen and keyboard are not passing through the user ac device.

2) A second, better form of browsing would be a secure connection using the non-extractable key in the ac/dc adapter. The dc server has the matching key and through the use of a proxy that uses the ac/dc adapter key (or other relevant key) or by using direct or other type of connection that uses the key in various ways, such as encrypting traffic with the key before data arrives at the ac device and then transferred This way we achieve a secure connection between the web browser and the dc server. In such a scenario, the web content is encrypted end to end from the server to the user.

Doing this may allow regular internet to be served of course and we will call this case 2A. More importantly and interestingly, an enterprise secure browsing may be offered, running web pages and web applications from the enterprise servers carrying confidential internal enterprise data, right to the end user running the secure web browser this case will be referred to as case 2B. This way browsing internal enterprise sites and using web based apps and all internal web traffic as if you are located within the enterprise is now possible to the end user outside the enterprise using the device equipped with ac/dc net.

The device authenticates to the server using its non-extractable key, making the use of authentication redundant, thereby tying the device to the company platform. Note a fingerprint reader or secondary password (or other means of authentication—iris scanner etc.) may still be in use, such as for using the device as a whole or also for using the secure web browser.

Running a secure web browser application as a dc application on the user device does not allow an attack to screen scrape (take screenshots), log the keyboard and optionally mouse clicks and does not allow to insert keyboard typing, as well as other I/O capabilities such as camera input, printing output etc. Furthermore in case 2A and 2B the network is encrypted with the non-extractable key. Furthermore in case 2B the traffic is all secured end to end.

This capability is leveraging on the ability to use the user device I/O devices with ac/dc net without the user device (ac) reach. The ac/dc net has a key that is non extractable and optionally that key may be used to establish a connection with the cloud server for example. This data is then passed to the cloud server to be used for the user session.

In this way the last mile is protected end to end and the secure browser solution become secure as if the user was actually browsing and working from the servers located at the cloud physically or at the enterprise IT server site, specifically for case 2B above.

This embodiment may be viewed as a second personality to the user device that acts only as a web browser client with secure I/O and a secure key for authentication.

In some embodiments, encrypting the traffic using an un-extractable key and taking care of the screen and keyboard I/O interception from the endpoint is preferable.

This way a web browser allows running any business web application securely and browsing any data securely and entering any data without the data ever reaching the endpoint.

Following is an example to explain an embodiment. Suppose I would like to use internal company ABC intranet securely. ABC would place an ac/dc adapter in their cloud. I would use ABC web apps/browsing from my ac/dc net device the same way I use the app/browsing today. ABC would serve me apps/web exactly as they do today. The only difference on the server side is sending out the data using the un-extractable key in my device to my device and on my end using an ac/dc net capable device.

The result is no change in code or server/client technology. Only the addition of the ac/dc framework.

When a cloud vendor implements an ac/dc net infrastructure at their cloud premises, the cloud vendor may offer services based on the ac/dc net infrastructure as a service.

Suppose the infrastructure to communicate between the cloud vendor and end users exists. A $3^{rd}$ party app may be using the cloud and using the cloud vendor capability to communicate with the end users securely, thereby using their app in ac/dc net.

For example, if a bank would like its app to be used in ac/dc net such that no screen scraping/key logging etc (as explained above) is possible, it places the app or a communication to their infrastructure on the cloud vendor and passes the communication through the cloud vendor infrastructure. This way ac/dc net may be given as a service by a vendor to another vendor.

Examples for such uses are vast, from financial implementation to medical, legal, etc.

Now suppose I would like to use Google services securely. I would be able to use all Google web applications such as Gmail and Google Apps securely. Google could use the infrastructure as explained above. Google would alternatively be able to place an ac/dc infrastructure in their cloud. I would use Gmail from my ac/dc net device the same way I use Gmail today. Google would serve me Gmail exactly as they do today. The only difference on the server side is sending out the data using the un-extractable key in my device to my device and on my end device using an ac/dc net capable device to view and interact directly without the ac device able to see the traffic.

Please note placing ac/dc net infrastructure in the cloud may mean in some embodiments, placing a service that may communicate securely with end users using some pairing of keys located at the user device. This is referred to, for example in the secondary application as a dc server.

This way the end user using her device may use a web browser client without the data ever reaching her device and the data is secure end to end using the device un-extractable device bypassing the trust model, HTTPS, MITM attacks. If authentication is also done using the non-extractable key then this also bypasses social engineering and also no passwords may be used as the device itself may be used as authentication for using the non-extractable key. This point is relevant not only for web but also all other items in this application, please note this generality. This means it is as if she is located at the web server premises which is favorable. Any party trying to eavesdrop or break into the session will only see data encrypted with the non-extractable key.

Using a secure web browser is not only a secure solution but a platform enabler because if the user may be considered as if she is located at the servers then new options open up for delivering new or much cheaper services that are not offered today precisely because of the insecurity. Such services may be based on different regulation requirements as well as other organizations that are simply refrained from using these services all together.

This service may be installed as infrastructure or used as a service on a cloud vendor platform for example.

In some embodiments a service from a cloud service provider is implemented using ac/dc net. A cloud service provider may offer solutions as described here relating to VDI/DaaS but also for the secure web browser.

A secure web browser service may be given to a company as a service. This means that the company doesn't need to handle the infrastructure that manages the endpoints and their non-extractable keys etc. The cloud service can offer a service that gives the company's employees or other people access to secure browsing based on their infrastructure.

This service is also relevant for regular people using the internet that want to use a sensitive application like a banking web site. Suppose a cloud service has implemented the ability to connect with end users using their non-extractable keys in the ac/dc net device.

Now suppose bank B wants to serve their web app with the secure ac/dc net device so that no screen scraping or key logging or any network sniffing is possible.

In this case the bank leverages the cloud vendor ability to connect with the end user directly and uses their service to utilize the capability securely offer such services.

This is relevant for any company that wants to offer such secure services as banks, medical, payment web utility etc.

The service may work as is or close to what it's like today leveraging the cloud service capability to offer such a service.

If the cloud service provider offers SaaS then these could be leveraged by the ability to connect to the end user directly and communicate securely.

Therefore a VDI solution and a web browser secure solution which are of great usefulness to the end user as well (not necessarily an enterprise employee) because having a way to go to your bank account only, purchase online, go to certain services confidentially such as financial, medical, etc. is of great value to the end user.

In some embodiments a secure app. Is implemented using ac/dc net. A secure app may be important for a company such as an enterprise for their workers. Securing the app such as how a web browser above is secure, is a generality of the case of the web browser.

The ability to secure an app which will run in DC directly with a cloud service for example, bypassing screen scrapers and key loggers as well as securing the traffic with the non-extractible key to a cloud service or other company service close to how it is explained in the secure web browser and remote desktop client.

In the general case an app may be secured to offer such a product from a cloud vendor, as a service for example, or directly from an enterprise.

In general, any windows app in this context may be secured which appears on your desktop but separated from the device ac reach.

In some embodiments, web services may be implemented through holes in server. A web server or application on the ac platform may use the dc platform for small sub-pages portions within a page for placing an image or a text input field for example. This way it is possible to secure one or multiple portions of the page securely form ac using dc.

Direct path to user I/O with non-extractable keys. The possibility of interfacing directly with the user while bypassing the device and using non-extractable keys to encrypt the data communication with the server is as perfect security as it gets. This is one of the important aspects for allowing to server different capabilities based on a feature like this.

In another way of looking at this, this is like two different devices that share I/O for interfacing the user. One of the devices has non-extractable key for transmitting data interaction with a server.

This may be viewed as a second personality to the user device that has a secure I/O and a secure key for authentication.

Encrypting the traffic using a non-extractable key and taking care of the screen and keyboard I/O interception from the endpoint is preferable.

This way second personality allows running any business application securely without the data ever reaching the endpoint.

In some embodiments IoT devices may be implemented using ac/dc net. The ac/dc net can be used for securing IoT devices end to end. An IoT device may have an ac/dc adapter with a non-extractable key that communicates with a user device directly or through the cloud having an ac/dc adapter configured to communicate with that IoT device. This way it is possible to protect IoT devices end to end.

In case where an IoT device runs on battery it is possible to place the ac/dc net adapter at the local hub that the device communicates with. If that device securely communicates with that hub such as with a certain part of the hub that is preferably separated from other communication, that part may include an ac/dc net adapter for that device. That ac/dc adapter is then used to communicate with the end user device and cloud device, each with their ac/dc adapter to achieve end to end protection.

In some embodiments, vehicles may use ac/dc net. Vehicles may be viewed as a special kind of IoT devices environment, where multiple IoT devices communicate amongst themselves as well as allow communications with external entities. In this case, each IoT device has an ac/dc adapter and is configured to communicate with certain devices in the car. IoT devices are configured to communicate with a cloud server that has a dc server as well. Parts within the car can be separated using ac/dc net adapters. For example, entertainment system may be separated from other IoT devices. Even the entertainment system may have an IoT device for communicating with the cloud or other devices using the ac/dc adapter's non extractable key.

Some examples of the uses of ac/dc net. A vehicle cloud service that watches over different vehicles performance can be implemented using ac/dc net. Similarly an entertainment cloud, an ad server etc. all can use ac/dc net.

The general concept, the idea is that instead of patching and correcting security problems, bypass the attack vectors of the adversary entirely so that the adversary has no attack surface to initiate an attack.

Here now is presented a formal proof that using an ac/dc net device with a dc server making use of an ac/dc adapter, prevents an attacker from impersonating the user and logging into the user account, from eavesdropping the communication and from modifying it.

Assume an attacker authenticated to the server to read a dc message. Since the non-extractable key is located only at the user's ac/dc adapter, the attacker must be using the user dc device or the ac/dc adapter.

Let's assume the user dc device is used by the attacker successfully. Since the I/O is directed directly to the user through the I/O switch and on a separated HW region, the attacker must have accessed the dc SW or App.

The dc app is the first SW that is executed from the image so assuming the dc app doesn't just allow you inside without doing anything, attacker have changed the image.

The image is signed and protected using the non-extractable adapter key so the attacker must be using the ac/dc adapter and not the dc device.

As a side note, the case where the attacker reaches the dc through the ac/dc adapter is covered in the ac/dc adapter case.

Assuming now the ac/dc adapter is used by the attacker successfully. Since the adapter exclusively runs standalone signed programs with its public key running on a separate HW, the attacker must have found a weakness in the signed program.

The signed program is a simple program with two states encrypted data from dc to ac with the non-extractable key and decrypting data from ac into dc using the non-extractable key. In some embodiments a state of currently running app and not running app is used. This very simple state machine can be proven for correctness and the inability to modify it. The code is in another HW protected region to the attacker not able to modify the running code. Therefore the attacker cannot use the ac/dc adapter successfully, in contradiction to our hypothesis. QED.

It is worth noting that the attacker cannot use the ac/dc adapter of the server for similar reasons, since the server has less capabilities than the endpoint device such as no I/O.

The term ac domain or ac is used throughout this disclosure to specify a domain that is connected to the network including various devices and media that connect directly to the network or connect to devices that connect to the network. Devices in this domain are prone to cyber-attack.

The term dc domain or dc is used throughout this disclosure to specify a domain or a device that may disconnected from ac devices access. In some embodiments it may refer to a second personality or second isolated device from the first. This may resemble the initial applications. This term should not be meant as limiting but as an enabler to achieve certain goals as written here and in the previous applications.

In some embodiments the network in the term dc and ac is the internet.

The term terminal is used throughout this disclosure as input/output means for a user such as a touch screen where the user views and can enter touch events, and such as a display, keyboard and mouse in case of a pc or laptop. The term dc terminal is used for specifying input/output means in the dc domain where the input/output means are not accessible from ac domain such that no device accessible to ac has access to the user input and output. The term ac terminal is used for specifying input/output means in the ac domain where the input/output means are accessible to the ac domain such that device accessible to the network has access to the user input and output.

The term disconnection unit also referred to as ac/dc adapter stands for a unit which disconnects the ac domain from the dc domain as well as may isolate dc application instance from other dc application instances.

The term combined disconnection stands for a unit combining ac device connecting to the network with ac/dc adapter in a single descriptive unit which may be implemented as a single device but not necessarily. This unit is connected to a network on one side and to a dc device on the other.

The term dc message refers to messages sent in the dc domain. It may have an identified sender and receiver, an application name and specific instance as well as other identifying data.

The term user machine or user device used throughout this disclosure may generally refer to a device such as a computer, a laptop, tablet, smart-phone, Chromebook or any other computing device that may connect to the network and optionally external media and may be exposed to external attacks such as through the network. The term may also refer to a computing unit connected to the network that serves as a unit for handling communications while a user may control a device that uses the unit for communicating indirectly through the network. A connection to the network may be through any connection, wired or wireless.

The term ac/dc net is the name for the technology that includes on the one hand ac devices, dc devices and an ac/dc adapter connecting between them. In this disclosure the term dc may be broaden in some embodiments in a way so that it may be able to have some connection to the network, (such as a secure network browser). The adapter may not reset dc on each app in every embodiment. And so forth. The scope of the application should not be limited based on claims such as these as these fall within the true spirit of the disclosure. It is one thing to make an explanation and describe a perfect or near perfect securing mechanism and another making real world embodiments for example that allow using the G-suit on a secure connection directly from Google, or using a company intranet web app through dc using a secure connection direct with the company servers. Even implementations of TrustZone that are not 100% bulletproof because of any reason, be it vendor shortcomings or imperfect designs. IT would only make it a goal to make hackable platforms to overcome this paper so no, this should cover them apriori. What can I say, even I am becoming flexible, what do you know. At any rate these should not limit the scope of the invention just because a key is not entirely non-extractible or taken by a communication channel. The scope of the disclosure is in what it allows—among others, services by a cloud based platform to supported endpoints and if the dc has networking capabilities with the server for example, this is well within the scope of the paper. If the I/O is hidden from the main OS on the device and services such as secure remote desktop or secure web browsing are served then this is within the true spirit of the disclosure as well as other modifications and shortcomings.

The ac/dc net technology with the non-extractable key can work using SSL or IPSec—, there is no limitations on the way keys are used, what protocols are used etc. The communication may be implemented as a standard connection or a proprietary one based best suits the requirements. This could even be done in a way that uses keys in ac or other keys so as to protect only screen/keyboard but not traffic. This should not be a limitation of the technology.

The ac/dc net technology and other relating ones discussed in this disclosure may be described as, sharing the key in your device with the server initially, to deliver end to end secure solutions. This key sharing may take place at manufacturing for example. Furthermore, end to end connection between user I/O to the server with no ability to intercept the data from ac.

A connection between an endpoint device and a cloud vendor in the way described by ac/dc net may be viewed as a platform that may offer services between endpoints and servers securely.

Ac/dc net is the name for the technology that includes on the one hand ac devices, dc devices and an ac/dc adapter connecting between them. Please see the secondary application as well as the initial applications. In this paper the term dc may be broaden in some embodiments in a way so that it may be able to have some connection to the network. The adapter may not reset dc on each app in every embodiment. This is more to make an explanation and embodiments should not be limited based on such restrictions.

In this disclosure there is a system and method for the separation of systems that work together such that these systems appear as a single system to the user and can communicate but remain separated. Attempted attacks on different parts of the system may be identified and mitigated by checking the display, either the combined display or the display coming from each part of the system. The unwanted image or other type of display may be removed and the related system restored to a known state.

CONCLUSION, RAMIFICATIONS AND SCOPE

Accordingly, the reader will see that the disclosure of this invention provides a system and method for the separation of systems that work together such that these systems appear as a single system to the user and can communicate but remain separated. Attempted attacks on different parts of the system may be identified and mitigated by checking the display, either the combined display or the display coming from each part of the system. The unwanted image or other type of display may be removed and the related system restored to a known state.

Furthermore, this disclosure provides secure services such as from a cloud service vendor to a user device in a way that bypasses the user device connected to the internet and any vulnerabilities it may have.

Such services may include secure remote desktop for VDI/DaaS, secure browsing for intranets and $3^{rd}$ party vendors and secure apps. This may be extended to web apps of small and large internet providers. This capability may be given as a service from a cloud service vendor.

Also the reader will see that the disclosure of this invention provides a system and method for providing the system as SW only on ARM based devices and mostly SW only on Intel platforms as well as others. This is possible using hardware features on these processors that allow them to offer multiple device operation on the single chip.

While certain features of the invention have been illustrated and described herein, many modifications, substitutions, changes, and equivalents may now occur to those of ordinary skill in the art. It is, therefore, to be understood that the appended claims are intended to cover all such modifications and changes as fall within the true spirit of the invention.

It is expected that during the life of this patent many relevant devices and systems for separating sub systems, combining display or combining other output means to the user, other means of identifying unwanted display or other output data to the user and other means of removing that unwanted data and restoring the systems to a working state and other ways of removing network attack surface will be developed and the scope of the terms herein, particularly of the terms "cloud", "cloud service", "keyboard secure path", "ac device", "dc device", "dc domain", "ac domain", "ac/dc adapter", "dc server", "dc framework", "ads", "IoT", "separation", "display", "identifying", "filtering" and "smart vehicles" are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for separating a plurality of computing devices that operate together comprising:
   a. two or more computing devices;
   b. a display combining function for combining at least part of display output of said two or more computing devices to a single display; and
   c. a display communication function for communicating one-way display output of at least one computing device of said two or more computing devices to at least one other computing device of said two or more computing devices, whereby said two or more computing devices belong to one same entity and work together by displaying data on one same display device, and at least part of display output of said at least one computing device is sent to said at least other computing device for displaying on the display device.

2. The system of claim 1 further comprising a monitoring unit for monitoring said at least part of display output of said at least one computing device according to set criteria for display.

3. The system of claim 2 further comprising a modifying unit for modifying said at least part of display output of said at least one computing device when said criteria is found by said monitoring unit, whereby an unwanted display according to said criteria is overridden by said modifying unit.

4. The system of claim 3 further comprising a reset unit for returning said at least one computing device to a known state when said monitoring unit identifies a requirement to reset said at least one computing device according to said criteria.

5. The system of claim 1 further comprising secure networking means to securely communicate over a network by said at least one other computing device.

6. The system of claim 5 wherein a VDI client uses said secure networking means to communicate over the network and receive data for displaying on said display device.

7. The system of claim 5 wherein a secure web browser uses said secure networking means to communicate over the network and receive data for displaying on said display device.

8. A system for protecting a user display from displaying unwanted data comprising:
   a. two or more computing devices;
   b. a display device;
   c. a display combining function for combining at least part of display output of said two or more computing devices to a single display;
   d. a display communication function for communicating one-way display output of at least one computing device of said two or more computing devices to at least one other computing device of said two or more computing devices, whereby said two or more computing devices belong to one same entity and work together by displaying data on one same display device, and at least part of display output of said at least one computing device is sent to said at least other computing device for displaying on the display device; and
   e. a monitoring unit for monitoring said at least part of display output of said at least one computing device according to display criteria for display.

9. The system of claim 8 further comprising a modifying unit for modifying said at least part of display output of said at least one computing device when said display criteria is found by said monitoring unit, whereby unwanted display output according to said criteria is modified to prevent displaying unwanted data to the user.

10. The system of claim 8 further comprising a reset unit for returning said at least one computing device to a known state when said monitoring unit identifies a requirement to reset said at least one computing device according to said criteria.

11. The system of claim 8 further comprising secure networking means to securely communicate over a network by said at least one other computing device.

12. The system of claim 11 wherein a VDI client uses said secure networking means to communicate over the network and receive data for displaying on said display device.

13. The system of claim 11 wherein a secure web browser uses said secure networking means to communicate over the network and receive data for displaying on said display device.

14. A system for protecting a user display from displaying unwanted data comprising:
   a. a computing device comprising two or more separate systems;
   b. a display combining function for combining at least part of display output of said two or more separate systems to a single display;
   c. a display communication function for communicating one-way display output of at least one system of said two or more separate systems to at least one other system of said two or more separate systems, whereby said two or more separate systems work together by displaying data on one same display device, and at least part of display output of said at least one system is sent to said at least other system for displaying on the display device;
   d. a monitoring unit for monitoring said at least part of display output of said at least one system according to criteria for display; and
   e. a modifying unit for modifying said at least part of display output of said at least one system when said criteria is found by said monitoring unit, whereby unwanted display output according to said criteria is modified to prevent displaying unwanted data to one or more users.

15. The system of 14 wherein said monitoring unit and said modifying unit are not accessible by said computing device.

16. The system of 14 wherein said monitoring unit and said modifying unit are in a separate hypervisor to said computing device.

17. The system of 14 wherein said monitoring unit and said modifying unit are in a separate TrustZone executing environment from said computing device.

18. The system of 14 wherein said monitoring unit and said modifying unit are in a separate on chip co-processor executing environment from said computing device.

* * * * *